July 25, 1933. C. C. SUNDERLAND 1,919,347
COMPRESSED METAL JOINT AND METHOD OF MAKING THE SAME
Filed Jan. 9, 1931
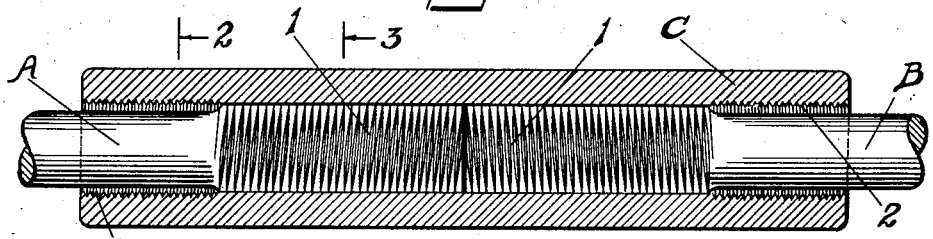
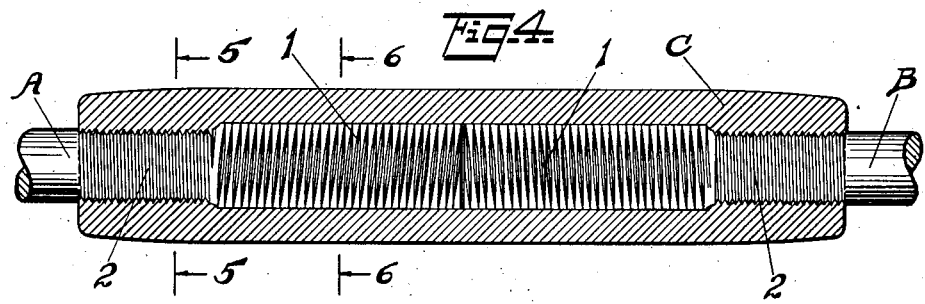
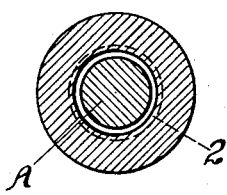 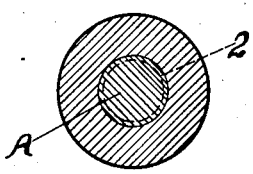
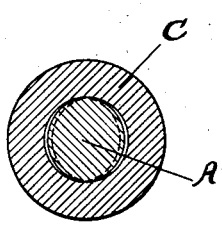 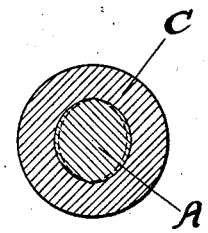
Inventor
Charles C. Sunderland
By his Attorneys Patented July 25, 1933

1,919,347

UNITED STATES PATENT OFFICE

CHARLES C. SUNDERLAND, OF NEW BRUNSWICK, NEW JERSEY, ASSIGNOR TO JOHN A. ROEBLING'S SONS COMPANY, OF TRENTON, NEW JERSEY, A CORPORATION OF NEW JERSEY

COMPRESSED METAL JOINT AND METHOD OF MAKING THE SAME

Application filed January 9, 1931. Serial No. 507,745.

This invention relates to an improved wire connection of the type in which a sleeve is compressed down upon the two wire ends to be connected and is adapted especially for connecting the ends of wires under heavy strain, as for instance, wires to be used in forming the parallel laid cables of suspension bridges.

The especial objects of the present invention are to provide an improved method of making such connection which shall be cheap and efficient and require no special care in its making, and to provide a novel form of connection which shall develop the full strength of the wire and be of highest efficiency. A further object of the invention is the production of a connection requiring less pressure in its formation, thereby materially reducing the wear on the dies and the number of dies required.

In the accompanying drawing forming a part of the specification, there is shown a construction embodying the invention in its preferred form and this construction and the method of making it will now be described in detail and the features forming the invention then be specifically pointed out in the claims.

In the drawing:

Figure 1 is a view in sectional side elevation of the parts prior to compression of the connecting sleeve;

Figures 2 and 3 are sections on, respectively, lines 2 and 3 of Figure 1;

Figure 4 is a sectional side elevation of the completed joint;

Figures 5 and 6 are sections on, respectively, lines 5 and 6 of Figure 4.

Referring to the drawing, the wire ends A, B, are provided respectively with serrations or projections 1, of any kind, but preferably by forming threads therein by dies which also change the shape of the threaded portion of the wire ends slightly from their original circular form to oval form, as shown clearly in Figures 3 and 6, the serrations 1 being formed on the opposing flattened sides of the wire ends A, B. A sleeve or nipple C is then slipped upon the wire ends A, B, and the wire ends abutted. The inner surface of the sleeve C may be plain throughout its length, but preferably the ends thereof, or that portion extending beyond the serrated portions 1, of the respective wires A, B, are provided with suitable serrations 2, as shown. The connection is now completed by compressing the sleeve or nipple C in any suitable manner, as by hydraulic pressure or by swaging, so that sleeve C is locked upon the wire ends.

The turning of the wires in the sleeve is prevented by the oval form of a portion of the wires in addition to the compression and serrations. The oval form also permits a flow of the metal of the sleeve and wires which reduces the pressure required. The ends of the wires outside the serrations 1 preferably are galvanized and the galvanizing not removed, the compression of the sleeve serrations into the galvanizing adding to the strength of the joint. The oval form of the wires preferably extends through only the serrated portions, the rest of the wires being left round, and the cold working of the sleeve to the reduced diameter of these round portions of the wires results in shoulders or abutments on the wires at the ends of the serrated portions which aid in making a strong joint.

It will be understood that the invention is applicable to connecting any suitable terminal or device to a wire as well as connecting the ends of two wires, and the term wire ends used in the claims is intended to include the end of such terminal or other device to be connected. It will be understood, also, that the invention is not to be limited to the detail constructions shown, but that modifications may be made therein while retaining the invention defined by the claims.

What I claim is:

1. The method of making a compressed wire joint which consists in shaping to a non-cylindrical form the wire ends to be connected, applying thereon a sleeve having its inner surface of different form from the wire ends and extending beyond the non-cylindrical portions of the wire ends, and compressing the sleeve upon the non-cylindrical portions of the wire ends and upon the wires beyond the non-cylindrical portions.

2. A compressed wire joint having wires with their ends shaped to non-cylindrical form, and a sleeve extending over the non-cylindrical portions of the wire ends and the portions beyond the non-cylindrical portions and compressed thereon to form interlocking shoulders between the sleeve and wire ends outside the non-cylindrical portions of the latter.

3. A compressed wire joint having wires with their ends shaped to non-cylindrical form, a sleeve extending over the non-cylindrical portions of the wire ends and the portions beyond the non-cylindrical portions and compressed thereon to form interlocking shoulders between the sleeve and wire ends outside the non-cylindrical portions of the latter, and interlocking projections between the portions of the sleeves and wires compressed together.

4. The method of making a compressed wire joint which consists in shaping to an oval form the wire ends to be connected and providing the oval portions of the wire ends with suitable projections, applying on the wire ends a cylindrical sleeve extending over the oval portions of the wire ends and upon the wires beyond the oval portions and provided with suitable projections opposite the last named portions of the wire ends, and compressing said sleeve on both portions of the wire ends.

CHARLES C. SUNDERLAND.